US006751625B2

(12) United States Patent
Ohgake

(10) Patent No.: US 6,751,625 B2
(45) Date of Patent: Jun. 15, 2004

(54) RECORD MEDIUM AND METHOD OF CONTROLLING ACCESS TO RECORD MEDIUM

(75) Inventor: Mitsuru Ohgake, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 253 days.

(21) Appl. No.: 09/826,215

(22) Filed: Apr. 4, 2001

(65) Prior Publication Data

US 2001/0044887 A1 Nov. 22, 2001

(30) Foreign Application Priority Data

Apr. 11, 2000 (JP) ........................................ 2000-109551

(51) Int. Cl.[7] ............................................. G06F 17/30
(52) U.S. Cl. ........................ 707/101; 707/200; 707/100; 707/9; 707/205
(58) Field of Search ................................. 709/216, 217, 709/226; 707/200, 205, 104, 9, 100, 10, 103, 101; 345/854; 711/158; 714/5

(56) References Cited

U.S. PATENT DOCUMENTS

| 5,390,318 | A | * | 2/1995 | Ramakrishnan et al. .... 711/158 |
|---|---|---|---|---|
| 5,410,691 | A | * | 4/1995 | Taylor ......................... 707/100 |
| 5,809,331 | A | * | 9/1998 | Staats et al. ................... 710/10 |
| 5,903,732 | A | * | 5/1999 | Reed et al. ................... 709/229 |
| 5,911,143 | A | * | 6/1999 | Deinhart et al. ......... 707/103 R |
| 5,991,777 | A | * | 11/1999 | Momoh et al. .............. 707/205 |
| 6,014,666 | A | * | 1/2000 | Helland et al. ................. 707/9 |
| 6,055,527 | A | * | 4/2000 | Badger et al. ................... 707/2 |
| 6,256,031 | B1 | * | 7/2001 | Meijer et al. ................ 345/854 |
| 6,292,798 | B1 | * | 9/2001 | Dockter et al. .................. 707/9 |
| 6,351,741 | B1 | * | 2/2002 | Flenniken ....................... 707/2 |
| 6,381,615 | B2 | * | 4/2002 | Gaither et al. .............. 707/200 |
| 6,389,427 | B1 | * | 5/2002 | Faulkner ................... 707/104.1 |
| 6,484,177 | B1 | * | 11/2002 | Van Huben et al. .......... 707/10 |
| 6,496,944 | B1 | * | 12/2002 | Hsiao et al. ................... 714/15 |

FOREIGN PATENT DOCUMENTS

| JP | 5257816 | 10/1993 |
|---|---|---|
| JP | 6295521 | 10/1994 |
| JP | 11134650 | 5/1999 |
| JP | 11134719 | 5/1999 |
| JP | 11134813 | 5/1999 |

* cited by examiner

Primary Examiner—Jean M. Corrielus
(74) Attorney, Agent, or Firm—Cooper & Dunham LLP

(57) ABSTRACT

A record medium includes a root-directory datum "c1" indicating only a root directory, a plurality of root-directory location data "en" through "eN", and a plurality of hierarchical root-directory data "cn" through "cN" corresponding to a plurality of disclosure levels "n" through "N". Each of the plurality of root-directory location data indicates a location of its corresponding root-directory datum. Each of the plurality of root-directory data indicates a different part of a directory structure of the record medium, in accordance with its corresponding disclosure level. If the disclosure level "n" provided to an authorized user is inputted, a root-directory datum "cn" corresponding to the disclosure level "n" is accessed by following the root-directory location datum "en", thereby allowing the authorized user to access to information located in a part of the directory structure indicated by the root-directory datum "cn". On the other hand, if an improper disclosure level is inputted or an unauthorized user tries to access to the record medium, the unauthorized user can only access to the root-directory datum "c1" indicating only the root directory.

24 Claims, 6 Drawing Sheets

RECORD MEDIUM AND METHOD OF CONTROLLING ACCESS TO RECORD MEDIUM

BACKGROUND OF THE INVENTION

1. Field of the Invention

The present invention relates to a record medium such as various types of optical disks and a method of controlling access to the record medium.

2. Description of the Related Art

Recently, an optical-disk record medium having a large storage capacity and portability has been commonly used as a record medium for a PC (Personal Computer). A typical recordable optical-disk record medium is, for instance, a CD-R (CD Recordable), a CD-RW (CD Re-Writable), or the like. In addition, a CD-ROM (CD Read Only Memory) is widely used as a read-only type record medium.

Information recorded on a record medium such as the CD-R or the CD-RW can possibly be information created by an owner of the record medium for the purpose of limiting access to the information to the owner or specific users. Additionally, highly important information such as confidential information of a company can possibly be recorded on the record medium. Accordingly, damage caused by a loss of the record medium or an unauthorized usage of the record medium by a third party is immense.

On the other hand, it has become important to prevent illegal copy of information recorded on a CD-ROM, by considering a copyright of the information.

Various suggestions have been made against the unauthorized usage of the record medium. For example, according to Japanese Laid-open Patent Applications No. 5-257816 and No. 6-295521, a usage-permission key or a one's own number key is provided to information such as a program or data recorded on a recoding medium, or the information is coded, for preventing an unauthorized access to the information or an illegal copy of the information.

Additionally, Japanese laid-open Patent Applications No. 11-134650, No. 11-134719 and No. 11-134813 disclose measures devised to deal with an unauthorized access to information recorded on a record medium or an illegal copy of the information. Such measures are applied to a method of recording the information on the record medium and an information recording/reproducing device, according to the Japanese laid-open Patent Applications No. 11-134650, No. 11-134719 and No. 11-134813.

However, a record medium is often installed or mounted in a data processing device such as a PC including an operation system, in fact. The condition is which the record medium is installed in the data processing device is a condition in which information can be reproduced from or can be recorded to the record medium through a drive device, since fixed information such as root-directory accessing information defined as a regular file system is recorded at a fixed location on the record medium. In other words, by controlling the drive device used for reading information from or writing information to the record medium, one can access the information recorded on the record medium.

Accordingly, the former methods of preventing the unauthorized usage of the record medium suggested by Japanese Laid-open Patent Applications No. 5-257816 and No. 6-295521 are not quite effective. Additionally, for example, an analysis on an encoding algorithm about encoded information enables the unauthorized usage of the information supposed to be protected originally.

On the other hand, the latter methods suggested by Japanese laid-open Patent Applications No. 11-134650, No. 11-134719 and No. 11-134813 cannot be applied to an information recording/reproducing device that has been already out in the market. Thus, such methods needs time to be achieved. In addition, a new information recording/reproducing device must be introduced so as to achieve the latter methods.

SUMMARY OF THE INVENTION

Accordingly, it is a general object of the present invention to provide a record medium and a method of controlling access to the record medium. A more particular object of the present invention is to provide a record medium and a method of controlling access to the record medium, which allow a specified user provided with a predetermined disclosure level to access to information corresponding to the disclosure level, provided that specified users can use information recorded on the record medium in a general environment such as a personal computer using the record medium.

The above-described object of the present invention is achieved by a record medium including a plurality of root-directory data, each root-directory datum indicating a different part of a directory structure of the record medium.

The above-described object of the present invention is also achieved by a method of controlling access to a record medium including a plurality of root-directory data, root-directory accessing information that is defined as a regular file system, and a plurality of root-directory location data indexed by a plurality of disclosure levels, wherein one of the plurality of root-directory data indicates only a root directory, each of the other root-directory data indicates a part of a directory structure of the record medium, the part corresponding to a disclosure level, the root-directory accessing information includes information used for accessing the one of the plurality of root-directory data, and each of the plurality of root-directory location data is used for accessing the other root-directory data in accordance with the disclosure level, the method including the steps of deciding whether a user is authorized to access to the record medium when the user tries to access the record medium; analyzing the disclosure level inputted by the user; accessing the root-directory datum corresponding to the disclosure level inputted by the user, by following the root-directory location datum in accordance with the disclosure level, thereby allowing the user to access to information recorded in the part of the directory structure indicated by the root-directory datum; and allowing the user to access to the one of the plurality of root-directory data indicating only the root directory, by following the root-directory accessing information, if the user is unauthorized.

Other objects, features and advantages of the present invention will become more apparent from the following detailed description when read in conjunction with the accompanying drawings.

DESCRIPTION OF THE PREFERRED EMBODIMENTS

A description will now be given of preferred embodiments of the present invention, with reference to the accompanying drawings.

Figure 1:
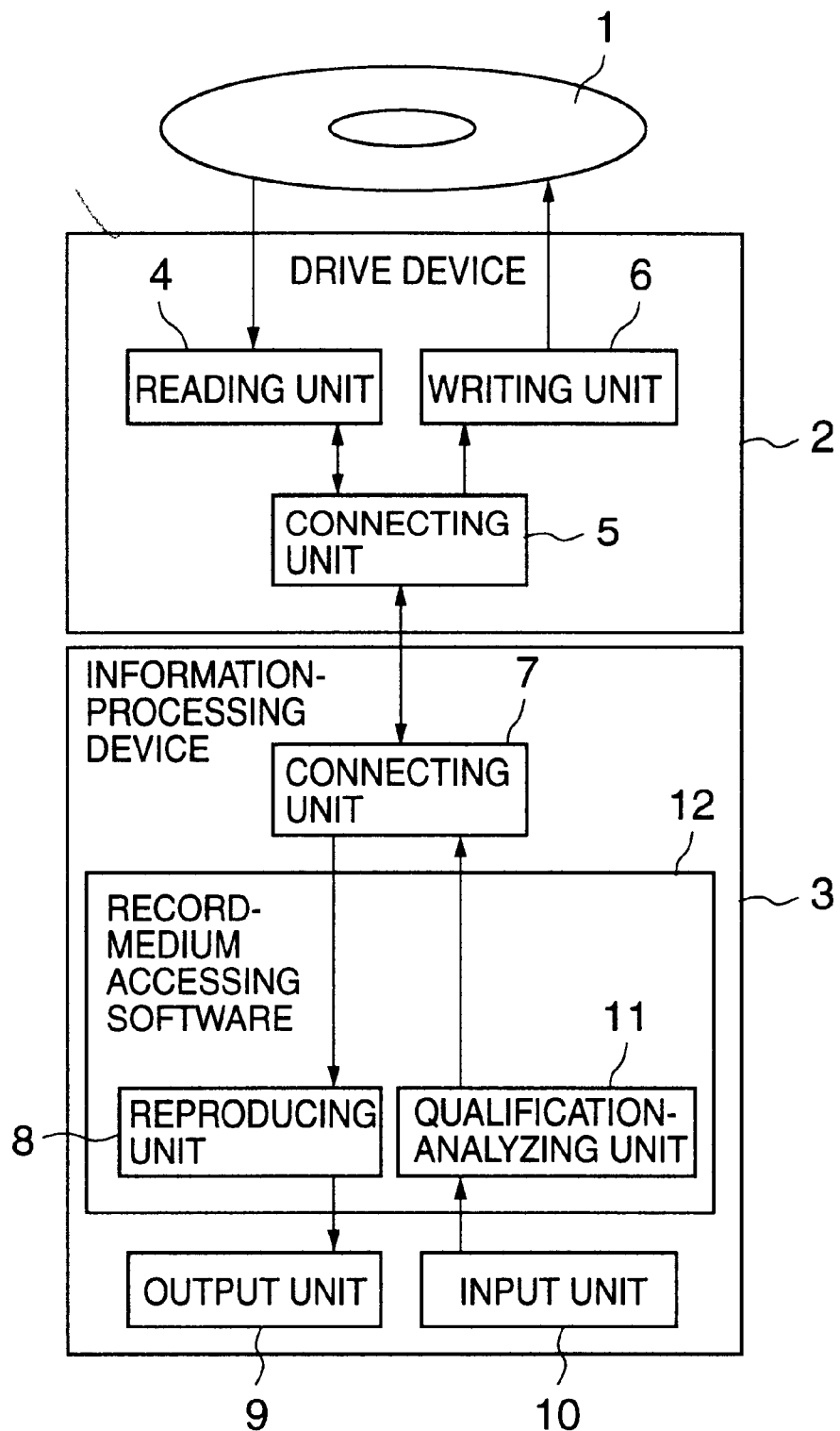
FIG. 1 is a block diagram showing a summarized structure of an optical-disk device, according to a first embodiment of the present invention.

A description will now be given of a first embodiment of the present invention with reference to FIG. 1. FIG. 1 is a block diagram showing a summarized structure of an optical-disk device, according to the first embodiment. The optical-disk device shown in FIG. 1 includes a drive device 2 and an information-processing device 3. The drive device 2 is used for mounting an optical disk, which is a record medium. The information-processing device 3 exchanges information and the like, with the drive device 2, and carries out other processes.

The optical disk 1 may be one of a CD-ROM from which data can only be reproduced, a CD-R to which data can be recorded, and a CD-RW to which data can be rewritten. Correspondingly, the drive device 2 may be one of a CD-ROM drive only having a data-reading function, and a CD-R/RW drive having a data-writing function. Additionally, the drive device 2 and the information-processing device 3 may be combined together.

The drive device 2 includes a reading unit 4 and a connecting unit 5. The reading unit 4 optically reads information recorded on the optical disk 1 by means of picking up light. The connecting unit 5 is used for connecting the drive device 2 to the information-processing device 3. If the drive device 2 is the CD-R/RW drive having a data-writing function, the drive device 2 further includes a writing unit 6 by means of picking up light, for writing information to the optical disk 1 by following a writing instruction supplied from the information-processing device 3.

The information-processing device 3 includes a connecting unit 7, a reproducing unit 8, an output unit 9, an input unit 10 and a qualification-analyzing unit 11. The connecting unit 7 is used for connecting the information-processing device 3 to the drive device 2 through the connecting unit 5. The reproducing unit 8 carries out an electrical process to use various information read from the optical disk 1. The output unit 9 outputs the information reproduced by the reproducing unit 8 to a user. The input unit 10 accepts information such as qualification inputted by a user. The qualification-analyzing unit 11 analyzes whether qualification information inputted through the input unit 10 is correct, by comparing the qualification information with pre-registered qualification information. According to the first embodiment, software for using a record medium (record-medium accessing software) 12 is installed in the information-processing device 3, for controlling an access to the mounted optical disk 1 by controlling operations of the reproducing unit 8 and the qualification-analyzing unit 11.

Figure 2:
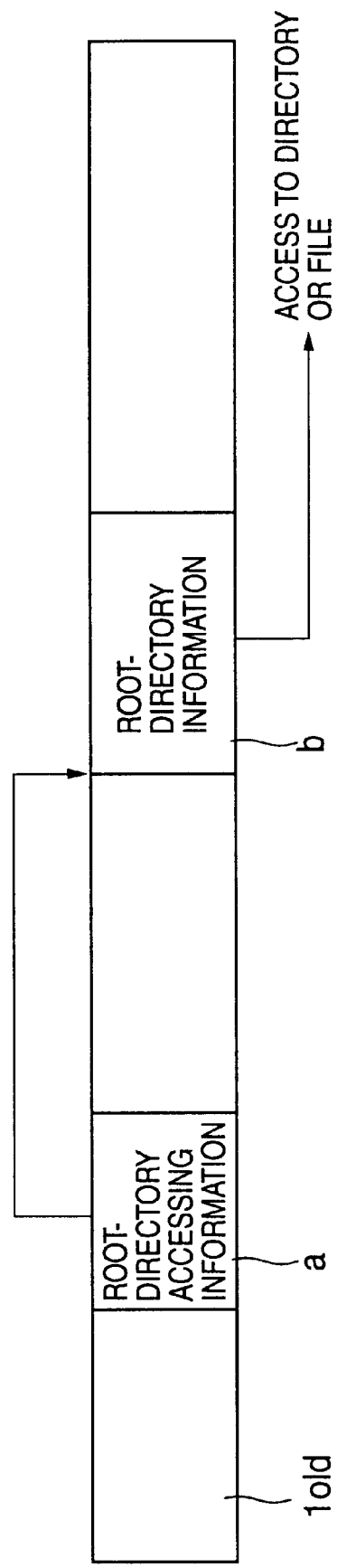
FIG. 2 is a diagram showing a structure of a general related-art optical disk.

A description will now be given of a structure of the optical disk 1 with reference to FIGS. 2 and 3. FIG. 2 is a diagram showing a structure of a general related-art optical disk $1_{old}$. The optical disk $1_{old}$ includes areas for storing root-directory accessing information "a" and root-directory information "b". The root-directory accessing information "a" defined as a file system is information used for accessing a root directory. The root-directory accessing information "a" is recorded in a PVD (Primary Volume Descriptor) in an ISO 9660 file system. In addition, the root-directory accessing information "a" is recorded in a FSD (File Set Descriptor) in a UDF (Universal Disc Format) file system. On the other hand, the root-directory information "b" is information whose recording area is pointed by the root-directory accessing information "a". A directory or a file recorded on the optical disk $1_{old}$ is accessed by following the root-directory information "b" stored in a recording area pointed by the root-directory accessing information "a", as arrows shown in FIG. 2.

Figure 3:
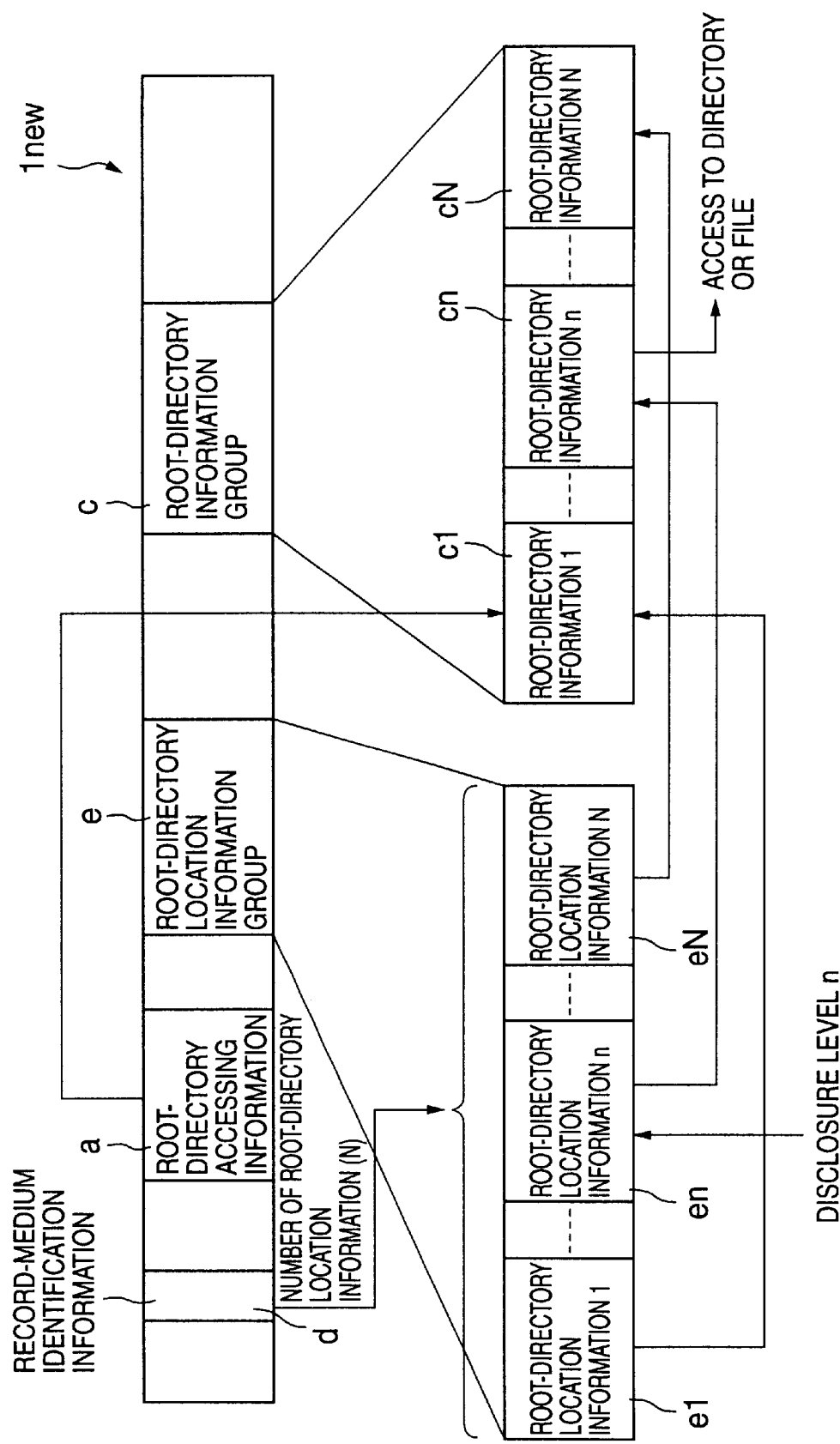
FIG. 3 is a diagram showing a structure of an optical disk according to a second embodiment of the present invention.

On the other hand, FIG. 3 is a diagram showing a structure of an optical disk $1_{new}$ according to a second embodiment of the present invention. The optical disk $1_{new}$ includes the root-directory accessing information regularly. In addition, the optical disk $1_{new}$ includes a root-directory information group "c", record-medium identification information "d", and a root-directory location information group "e". The root-directory information group "c" includes N root-directory information c1, ..., cn, ..., cN. The root-directory location information group "e" includes N root-directory location information e1, ..., en, ..., eN.

The record-medium identification information "d" is information used for deciding whether the optical disk 1 is the regularly recorded optical disk $1_{old}$ or the peculiar optical disk $1_{new}$ according to the second embodiment. According to the second embodiment, the number of the root-directory information (a root-directory information number N) is included in the recoding-medium identification information "d". Further, all of the number of the root-directory information, the number of the root-directory location information, and a disclosure level are set to "N".

The disclosure level indicates a level specifying an information area in the optical disk $1_{new}$ accessible by each user, such as a confidential level to each user, or a usage area corresponding to payment made by each user to contents of the optical disk $1_{new}$.

The root-directory accessing information "a" holds root-directory information indicating that only a root directory exists. This root-directory information corresponds to the root-directory information "c1", in the second embodiment.

Each root-directory location information included in the root-directory location information group "e" holds information to access its corresponding root-directory information included in the root-directory information group "c", in accordance with its disclosure level. The correspondences of the root-directory location information to the root-directory information are shown as arrows in FIG. 3. In the second embodiment, if the disclosure level is a level 1, the root-directory information "c1" is accessed from the root-directory location information "e1" corresponding to the disclosure level 1, and, then, information recorded in the root-directory information "c1" is accessed. However, according to the second embodiment, the root-directory information "c1" holds the information indicating that only a root directory exists, and, thus, an access to the information recorded in the root-directory information "c1" is not allowed. On the other hand, if the disclosure level is a level "n", the root-directory information "cn" is accessed from the root-directory location information "en" corresponding to the disclosure level "n", and, then, information recorded in the root-directory information "cn" can be accessed.

Figure 4:
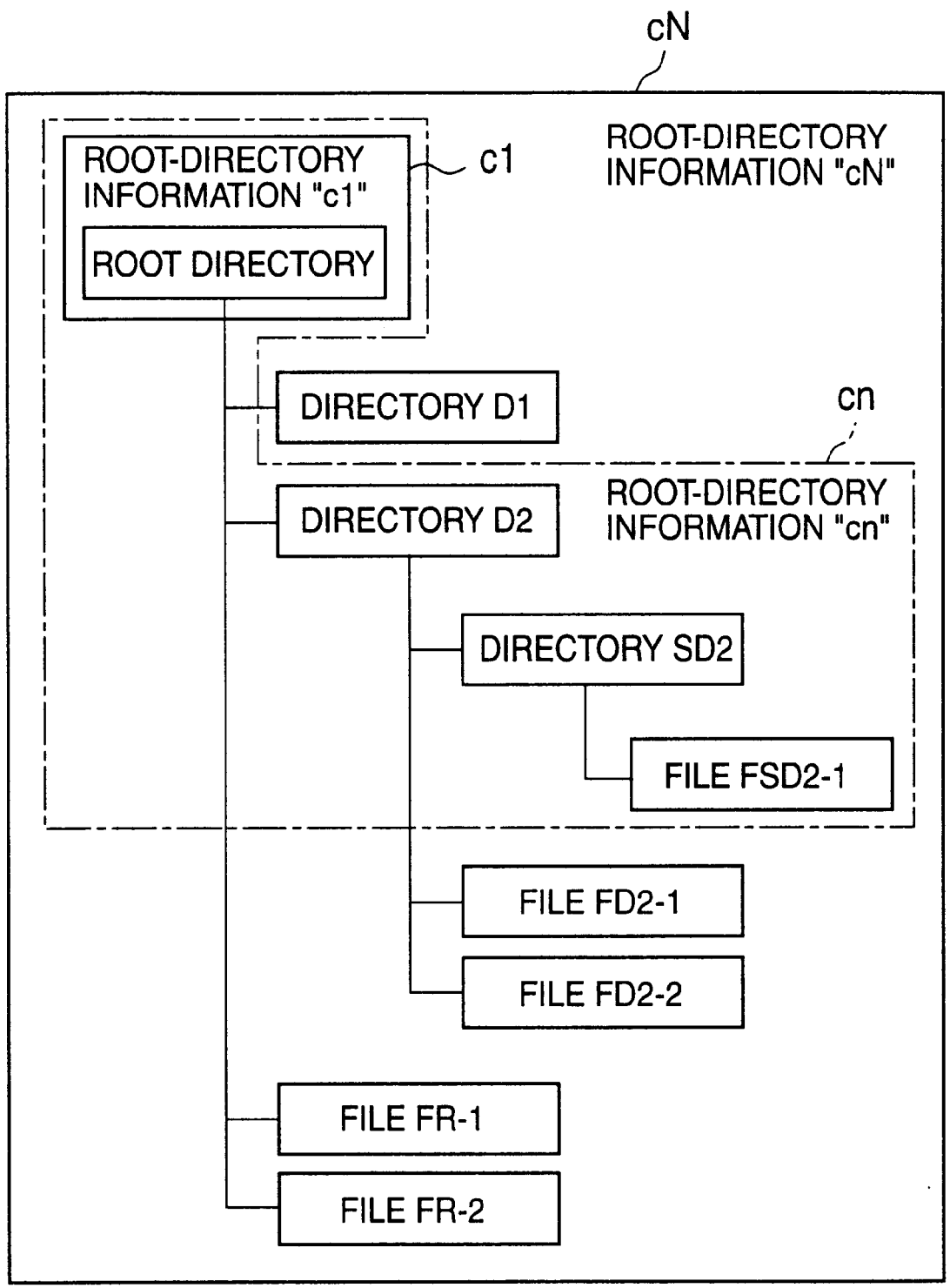
FIG. 4 is a diagram showing information recorded on the optical disk, or a directory structure of the optical disk, according to a third embodiment of the present invention.

FIG. 4 is a diagram showing information recorded on the optical disk $1_{new}$, or a directory structure of the optical disk $1_{new}$, according to a third embodiment of the present invention. For example, directories D1 and D2, and files FR-1 and FR-2 are provided under a root directory, as shown in FIG. 4. In addition, a directory SD2 is provided under the directory D2 as a sub-directory of the directory D2. Files FD2-1 and FD2-2 are provided under the directory D2. A file FSD2-1 is provided under the sub-directory SD2.

The root-directory information "c1" pointed by the root-directory accessing information "a" indicates a directory structure including only the root directory. On the other hand, if the disclosure level N is a level indicating disclosure of all the information stored in the optical disk $1_{new}$, location information about the root-directory information cN is recorded in the root-directory location information eN indexed by the disclosure level N. Additionally, a directory structure of all the information is recorded in the root-directory information cN. As described above, the location information about the root-directory information "cn" storing a directory structure disclosed at the disclosure level "n" is recorded in the root-directory location information "en", which is indexed by the disclosure level "n", or corresponding to the disclosure level "n".

As shown in FIG. 4, in a case in which only the file FSD2-1 can be disclosed to a user who is allowed to access the disclosure level "n", the root-directory information "cn" stores a directory structure including only the file FSD2-1. In addition, the location information about such root-directory information "cn" is recorded in the root-directory location information "en" indexed by the disclosure level "n". Corresponding to an access from an authorized user who is allowed to access the optical disk $1_{new}$ at the disclosure level "n", the root-directory information "cn" is accessed from the root-directory location information "en" indexed by the disclosure level "n". Accordingly, the user becomes able to access the file FSD2-1, and prohibited to access other files.

Figure 5:
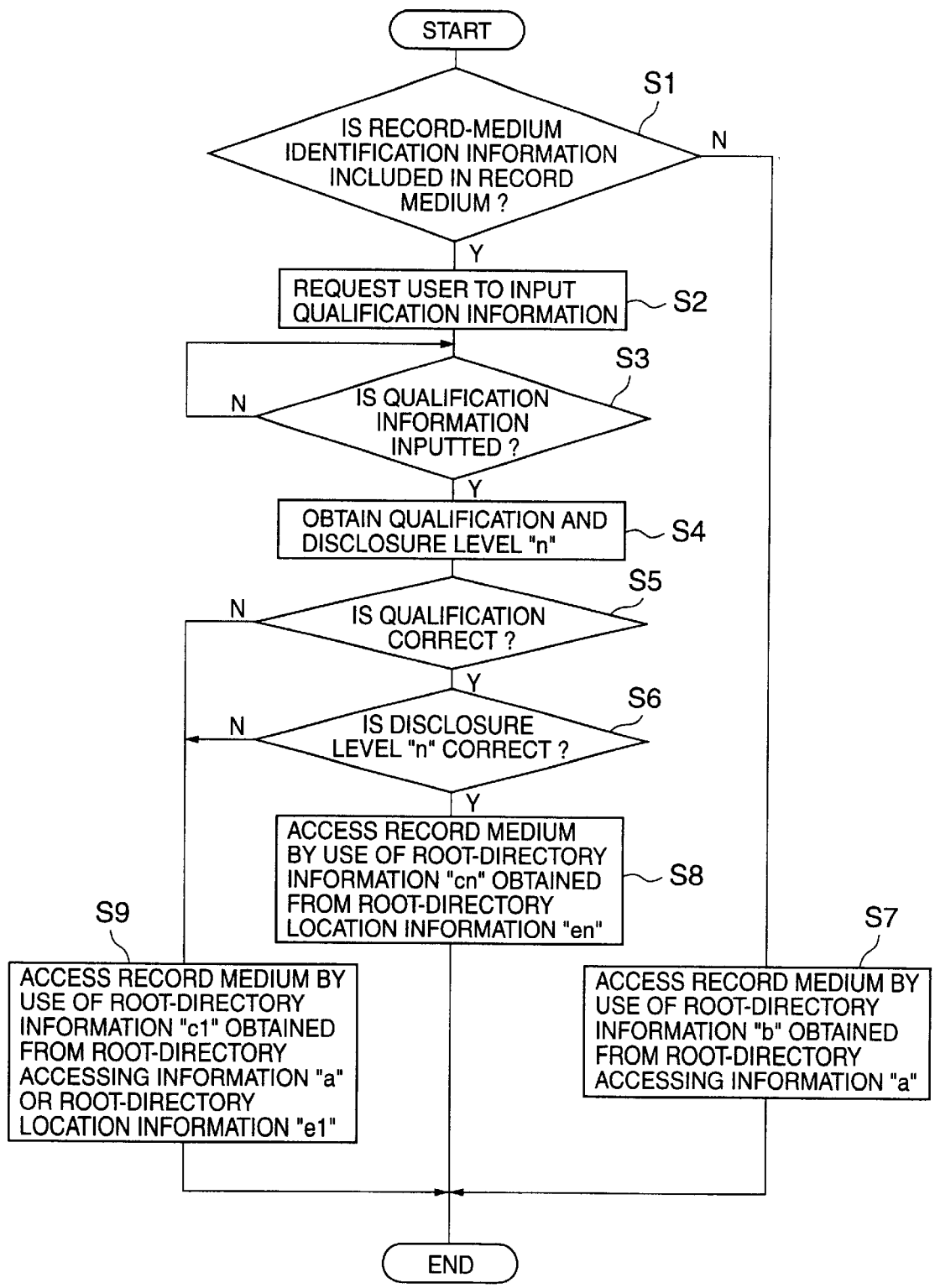
FIG. 5 is a flowchart showing an access controlling method performed by a record-medium accessing software, according to a fourth embodiment of the present invention.

A description will now be given, with reference to FIG. 5, of an access controlling method performed by the record-medium accessing software 12 installed in the information-processing device 3, according to a fourth embodiment of the present invention. FIG. 5 is a flowchart showing the access controlling method performed by the record-medium accessing software 12, according to the fourth embodiment.

When the optical disk 1 is initially inserted to the drive device 2, the drive device 2 notifies the information-processing device 3 about the insertion of the optical disk 1, through the connecting units 5 and 7. The record-medium accessing software 12, then, starts, and decides whether the optical disk 1 includes the record-medium identification information "d", at a step S1. If it is determined at the step S1 that the optical disk 1 does not include the record-medium identification information "d", the record-medium accessing software 12 determines that the optical disk 1 is the general optical disk $1_{old}$, and proceeds to a step S7. At the step S7, the record-medium accessing software 12 performs a regular access to information recorded on the optical disk $1_{old}$ by accessing the root-directory information "b" pointed by the root-directory accessing information "a".

On the other hand, if it is determined at the step S1 that the optical disk 1 includes the record-medium identification information "d", the record-medium accessing software 12 determines that the optical disk 1 is the peculiar optical disk $1_{new}$ according to the present invention, and proceeds to a step S2. At the step S2, the record-medium accessing software 12 requests a user to input qualification information such as a password, as well as the disclosure level "n", for determining whether the user is an authorized or permitted user. When the user has inputted the qualification information through the input unit 10 by following the request at a step S3, the qualification-analyzing unit 11 functions, and obtains qualification and the disclosure level "n" of the user by analyzing the qualification information, and by separating the qualification information into the qualification and the disclosure level "n", at a step S4. The qualification such as a password and the disclosure level "n" of the user are combined as the qualification information of the user, thereby increasing security of an access to the optical disk 1.

Subsequently, at a step S5, the record-medium accessing software 12 decides whether the qualification of the user is correct, or whether the user is an authorized and specified user, by comparing the qualification information inputted by the user and pre-registered qualification information. If it is determined at the step S5 that the qualification information inputted by the user is correct, and the user is an authorized user, the record-medium accessing software 12 proceeds to a step S6, and decides whether an area specified by the disclosure level "n" is proper or correct.

If it is determined at the step S6 that the disclosure level "n" specifies a proper area, the record-medium accessing software 12 searches for the root-directory location information "en" corresponding to the disclosure level "n", and accesses the root-directory information from the root-directory location information "cn", at a step S8. As described above, an access to information at the disclosure level "n" is permitted to the user.

On the other hand, if it is determined at the step S5 that the qualification information inputted by the user is incorrect, and the user is not an authorized user, the record-medium accessing software 12 proceeds to a step S9. Additionally, if it is determined at the step S6 that the disclosure level "n" does not specify a proper area, the record-medium accessing software 12 also proceeds to the step S9. At the step S9, the record-medium accessing software 12 accesses the root-directory information "c1" whose location information is recorded in the root-directory accessing information "a". In such a case, the record-medium accessing software 12 accesses to a root directory of a directory structure only including the root directory, since the root-directory information "c1" only includes the root directory. As a result, accesses to all the directories and files located under the root directory are prohibited to the user.

For example, in an environment loaded with Windows manufactured by Microsoft as its OS (Operation Software), it is possible to create a condition in which files and directories other than a root directory are invisible in Windows Explorer. By creating such a condition, improper accesses by an unauthorized user and by an improper disclosure level are prevented.

In the above-described fourth embodiment, qualification and a disclosure level are combined together, and are used as qualification information. However, the qualification and the disclosure level may be inputted to the optical-disk device separately, and may be analyzed separately. Additionally, in the case in which the qualification or the disclosure level obtained by the qualification-analyzing unit 11 is incorrect or improper, a user is not allowed to input new qualification or a new disclosure level, as described above. However, the optical-disk device may be designed to request the user to input correct qualification or a proper disclosure level for an appropriate number of times or forever until the user inputs the correct qualification or the proper disclosure level.

According to the present invention, the optical disk $1_{new}$ is mounted to the drive device 2 by following the root-directory accessing information "a" located at a fixed position in the optical disk $1_{new}$, in a general environment of using an optical disk, such as a PC (Personal Computer). The root-directory information "c1" includes only a root-directory, and the location information about the root-directory information "c1" is recorded in the root-directory accessing information "a" in advance. The root-directory information "c1" is validated in a case in which the record-medium accessing software 12 is not installed in the information-processing device 3, or in the case in which qualification information or a disclosure level inputted by a user is incorrect or improper. By validating only the root-directory information "c1", information recorded on the optical disk $1_{new}$ can be concealed. Therefore, information hidden from unauthorized users and improper disclosure levels, and copyrights are protected.

On the other hand, in the case in which correct qualification information or the proper disclosure level "n" is inputted by a user, the record-medium accessing software 12 validates the root-directory information "cn" whose location information is recorded in the root-directory location information "en" corresponding to the disclosure level "n" among the root-directory location information group "e". Subsequently, the record-medium accessing software 12 accesses information recorded on the optical disk $1_{new}$ normally, and supplies the information to the user.

Figure 6:
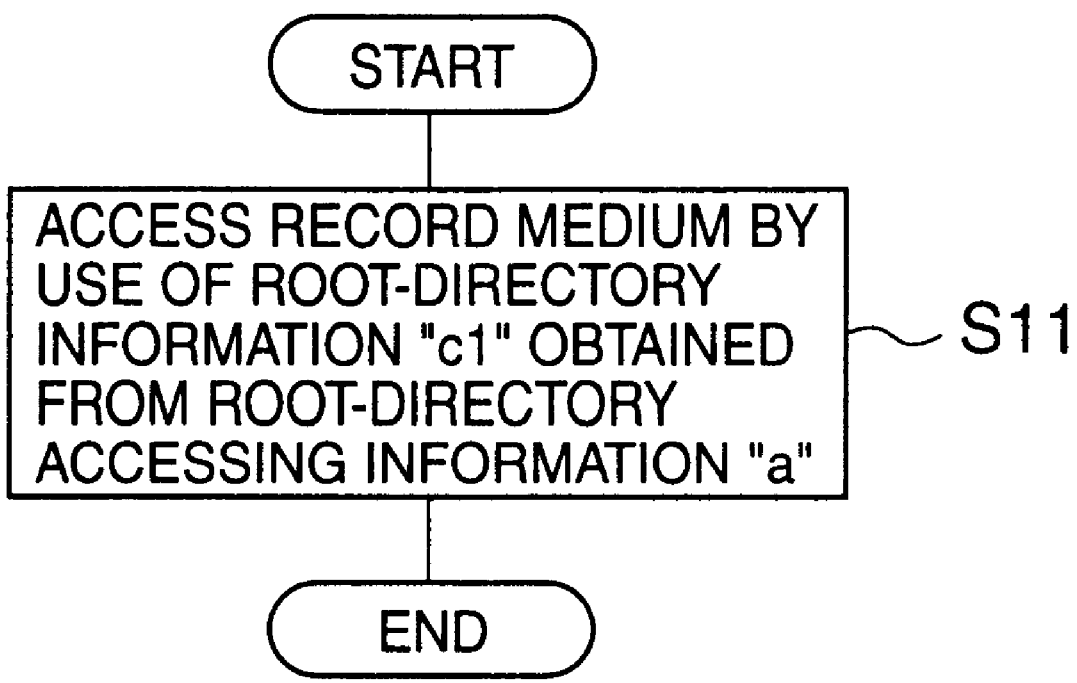
FIG. 6 is a flowchart showing the access controlling method performed in a case of using a related-art optical-disk device, according to a fifth embodiment of the present invention.

A description will now be given, with reference to FIG. 6, of an access controlling method in a case of inserting the peculiar optical disk $1_{new}$ according to the present invention to a general related-art optical-disk device that does not have the record-medium accessing software 12. FIG. 6 is a flowchart showing the access controlling method performed in the case of using a related-art optical-disk device, according to a fifth embodiment of the present invention.

As shown at a step S11 in FIG. 6, a related-art optical-disk device accesses to the root-directory information "c1" whose location information is recorded in the root-directory accessing information "a", by following a regular recording-area accessing method, in the case in which the optical disk $1_{new}$ is inserted. The root-directory information "c1" only includes a root directory, and, thus, the related-art optical-disk device accesses to the root directory in a directory structure including only the root directory. Consequently, accesses by the related-art optical-disk device to directories and files located under the root directory are prohibited. Accordingly, the optical disk $1_{new}$ according to the present invention provided a method of preventing an unauthorized access by an unspecified user to information record on the optical disk $1_{new}$ at a general related-art optical-disk device.

According to the present invention, the optical disk $1_{new}$ as a record medium includes a plurality of the root-directory data (information). Thus, the optical disk $1_{new}$ can allow only a user who has a predetermined level set for the user among specified users to access to information recorded on the optical disk $1_{new}$ by use of the plurality of the root-directory data, in accordance with the predetermined level.

Additionally, by including disclosure information in the optical disk $1_{new}$, a specified user having a disclosure level can access to only information corresponding to the disclosure level. Thus, the optical disk $1_{new}$ can achieve protection of confidential information and a copyright.

Additionally, the optical disk $1_{new}$ includes the record-medium identification information (data) for identifying the optical disk $1_{new}$ as a record medium having a plurality of the root-directory data as its root-directory information. Thus, the optical disk $1_{new}$ can be easily distinguished from a general record medium having a single root-directory datum. In addition, the record-medium identification data enables simplification of a control of accessing to information recorded on the optical disk $1_{new}$ by use of the plurality of the root-directory data.

The optical disk $1_{new}$ also includes information about the number of the root-directory data as the record-medium identification data, and, thus, the number of the root-directory data can be easily determined, thereby simplifying the control of accessing to information and increasing a control speed.

By including a root-directory datum indicating existence of only one root directory in the optical disk $1_{new}$, the optical disk $1_{new}$ can let an unspecified user use the root-directory datum so that the unspecified user incorrectly understands that no information is recorded on the optical disk $1_{new}$. Thus, the optical disk $1_{new}$ can prevent unauthorized usage of the optical disk $1_{new}$ in a general environment of using a record medium, such as a PC.

In a case of accessing the optical disk $1_{new}$ by use of a general related-art recording/reproducing device, a user can access to only the root-directory datum indicating existence of only one root directory. Thus, the optical disk $1_{new}$ can certainly prevent unauthorized usage of the optical disk $1_{new}$ in the general environment of using a record medium, such as a PC.

Additionally, by providing a plurality of the root-directory data corresponding to a plurality of disclosure levels in the optical disk $1_{new}$, accesses and controls of the plurality of the root-directory data becomes simple. Further, since the number of the root-directory location data (information) and the number of the root-directory data are the same, the correspondence of the root-directory data and the root-directory location data is simple. Accordingly, an access to a root-directory datum becomes simplified and faster than a related-art record medium.

Additionally, the root-directory location data is indexed by the disclosure levels, in the optical disk $1_{new}$. Thus, the optical disk $1_{new}$ can simplify and speed up access to the root-directory data as well as can maintain its reliability.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-109551, filed on Apr. 11, 2000, the entire contents of which are hereby incorporated by reference.

What is claimed is:

1. A record medium comprising a plurality of root-directory data, each root-directory datum indicating a different part of a directory structure of said record medium,
   wherein said plurality of root-directory data include a root-directory datum indicating that only a root directory exists in said record medium.

2. The record medium as claimed in claim 1, wherein said root-directory datum is set as root-directory accessing information that is defined as a regular file system, and is used for accessing the root directory.

3. A record medium comprising:
a plurality of root-directory data, each root-directory datum indicating a different part of a directory structure of said record medium; and
a plurality of root-directory location data,
wherein each root-directory location datum indicates a location of a corresponding root-directory datum in said record medium, and is used for accessing said corresponding root-directory datum.

4. The record medium as claimed in claim 3, wherein the number of said root-directory location data is equal to the number of said root-directory data.

5. The record as claimed in claim 3, wherein said plurality of root-directory location data is indexed by a plurality of disclosure levels of information recorded on said record medium.

6. A method of controlling access to a record medium including a plurality of root-directory data, root-directory accessing information that is defined as a regular file system, and a plurality of root-directory location data indexed by a plurality of disclosure levels, wherein one of said plurality of root-directory data indicates only a root directory, each of the other root directory data indicates a part of a directory structure of said record medium, said part corresponding to a disclosure level, said root-directory accessing information includes information used for accessing said one of the plurality of root-directory data, and each of said plurality of root-directory location data is used for accessing said other root-directory data in accordance with said disclosure level, said method comprising the steps of:
deciding whether a user is authorized to access to said record medium when said user tries to access said record medium;
analyzing the disclosure level inputted by said user;
accessing the root-directory datum corresponding to said disclosure level inputted by said user, by following the root-directory location datum in accordance with said disclosure level, thereby allowing said user to access to information recorded in the part of said directory structure indicated by said root-directory datum; and
allowing said user to access to said one of the plurality of root-directory data indicating only the root directory, by following said root-directory accessing information, if said user is unauthorized.

7. A record medium comprising a plurality of root-directory data used for accessing all or part of a directory structure that includes a root directory, wherein a range of the directory structure accessible by a root-directory datum differs for each root-directory datum.

8. The record medium as claimed in claim 7, further comprising a record medium identification for identifying a record medium that has said plurality of root-directory data.

9. The record medium as claimed in claim 8, wherein said record medium identification includes a number indicative of how many root-directory data are present.

10. A method of accessing information recorded on the record medium of claim 8, comprising the steps of:
attempting to acquire the record medium identification;
prompting an input of a disclosure level when the record medium identification is acquired;
selecting one of root-directory data that is to be accessed according to the input disclosure level; and
accessing information corresponding to an accessible range of a directory structure that is accessible by the selected one of the root-directory data.

11. The method as claimed in claim 10, further comprising the steps of:
prompting an input of authentication information; and
deciding whether the input authentication information is correct,
wherein said step of selecting one of the root-directory data is performed in response to a decision that the input authentication information is correct.

12. The method as claimed in claim 11, further comprising a step of deciding whether the input disclosure level is proper for the input authentication information, wherein said step of selecting one of the root-directory data is performed in response to a decision that the input disclosure level is proper.

13. An information processing system for reproducing information from the record medium of claim 8, comprising:
means for prompting an input of a disclosure level when the record medium identification is acquired;
means for reproducing a root-directory datum according to the input disclosure level; and
means for reproducing information corresponding to an accessible range of a directory structure that is accessible by the reproduced root-directory datum.

14. The information processing system as claimed in claim 13, further comprising:
means for prompting an input of authentication information; and
means for deciding whether the input authentication information is correct,
wherein said means for reproducing a root-directory datum reproduces the root-directory datum in response to a decision that the input authentication information is correct.

15. The information processing system as claimed in claim 14, further comprising means for deciding whether the input disclosure level is proper for the input authentication information, wherein said means for reproducing a root-directory datum reproduces the root-directory datum in response to a decision that the input disclosure level is proper.

16. The record medium as claimed in claim 7, further comprising root-directory accessing information for accessing a predetermined one of said root-directory data, wherein a range accessible by said predetermined one of said root-directory data includes only a root directory.

17. The record medium as claimed in claim 7, further comprising root-directory location data for accessing said plurality of root-directory data, said root-directory location data being provided as many as there are said root-directory data.

18. The record medium as claimed in claim 17, wherein the number of said root-directory location data is equal to the number of said root-directory data.

19. An information processing system for reproducing information from the record medium of claim 7, comprising:
means for prompting an input of a disclosure level;
means for reproducing a root-directory datum corresponding to the input disclosure level; and
means for reproducing information corresponding to an accessible range of a directory structure that is accessible by the reproduced root-directory datum.

20. The information processing system as claimed in claim 19, further comprising:

means for prompting an input of authentication information; and means for deciding whether the input authentication information is correct, wherein said means for reproducing a root-directory datum reproduces the root-directory datum in response to a decision that the input authentication information is correct.

21. The information processing system as claimed in claim 20, further comprising means for deciding whether the input disclosure level is proper for the input authentication information, wherein said means for reproducing a root-directory datum reproduces the root-directory datum in response to a decision that the input disclosure level is proper.

22. A method of accessing information recorded on the record medium of claim 11, comprising the steps of:

prompting an input of a disclosure level;

selecting one of root-directory data that is to be accessed according to the input disclosure level; and accessing information corresponding to an accessible range of a directory structure that is accessible by the selected one of the root directory data.

23. The method as claimed in claim 22, further comprising the steps of:

prompting an input of authentication information; and deciding whether the input authentication information is correct, wherein said step of selecting one of the root-directory location data is performed in response to a decision that the input authentication information is correct.

24. The method as claimed in claim 23, further comprising a step of deciding whether the input disclosure level is proper for the input authentication information, wherein said step of selecting one of the root-directory data is performed in response to a decision that the input disclosure level is proper.

* * * * *